United States Patent
Shapira et al.

(10) Patent No.: US 7,534,411 B2
(45) Date of Patent: May 19, 2009

(54) PROCESS FOR THE PREPARATION OF PURE SILICA

(75) Inventors: Lev Shapira, Beer Sheva (IL); Simcha Harel, Jerusalem (IL)

(73) Assignee: STI Silicon Technologies Israel Ltd., Jerusalem (IL)

( * ) Notice: Subject to any disclaimer, the term of this patent is extended or adjusted under 35 U.S.C. 154(b) by 557 days.

(21) Appl. No.: 10/505,689

(22) PCT Filed: Feb. 26, 2003

(86) PCT No.: PCT/IL03/00145

§ 371 (c)(1),
(2), (4) Date: Aug. 25, 2004

(87) PCT Pub. No.: WO03/072501

PCT Pub. Date: Sep. 4, 2003

(65) Prior Publication Data
US 2005/0106091 A1      May 19, 2005

(30) Foreign Application Priority Data

Feb. 26, 2002 (IL) .................................... 148376

(51) Int. Cl.
*C01B 33/12* (2006.01)
*C01B 33/08* (2006.01)

(52) U.S. Cl. ................... 423/336; 423/335; 423/340; 423/341

(58) Field of Classification Search ......... 423/335–342, 423/470–471
See application file for complete search history.

(56) References Cited

U.S. PATENT DOCUMENTS

| | | | | |
|---|---|---|---|---|
| 2,952,516 A | * | 9/1960 | Gross | 423/340 |
| 4,336,235 A | | 6/1982 | Deabriges | |
| 5,853,685 A | | 12/1998 | Erickson | |
| 6,312,656 B1 | | 11/2001 | Blackwell et al. | |
| 7,090,809 B2 | * | 8/2006 | Harel et al. | 423/111 |

FOREIGN PATENT DOCUMENTS

| | | | |
|---|---|---|---|
| GB | 909960 | * | 11/1962 |
| JP | 06293510 A | * | 10/1994 |
| WO | WO03/072501 | | 9/2003 |

OTHER PUBLICATIONS

Gangolli, S. (2005). Dictionary of Substances and Their Effects (DOSE, 3rd Electronic Edition). Royal Society of Chemistry: Online version available at: http://www.knovel.com/knovel2/Toc.jsp?BookID=527& VerticalID=0.*
Sakai, Yasuto. JP06-293510 Translation. Japanese Publication date Oct. 21, 1994.*

* cited by examiner

*Primary Examiner*—Steven Bos
*Assistant Examiner*—Anthony J Zimmer

(57) ABSTRACT

A production process for producing high-purity silica from a crude silica source by means of fluosilic acid, including the steps of: (a) subjecting the crude silica souce and the fluosilicic acid to a reaction in a reaction stage, so as to produce silicon tetrafluoride and water; (b) selectively evaporating the silicon tetrafluoride with respect to at least a portion of at least one impurity derived from the crude silica source, and (c) reacting the silicon tetrafluoride with water to produce the high-purity silica, wherein the reaction stage (a) is performed at a temperature above 75° C.

22 Claims, 1 Drawing Sheet

PROCESS FOR THE PREPARATION OF PURE SILICA

This application draws priority from Israel Patent Application Serial No. 148,376, filed Feb. 26, 2002.

FIELD AND BACKGROUND OF THE INVENTION

The present invention relates to a method of producing pure silica from a crude silica feed source, and more particularly, to a method in which the silica feed source is reacted with fluosilicic acid to produce an ultra-pure silicon tetrafluoride by-product.

Amorphous silica is an important industrial product, for which several industrial processes have been developed. The chemical handbook "Gmelins Handbuch der anorganischen Chemie", Vol. 21 (1928), p. 861, discloses a process of Liebig (1857) in which silica is autoclaved in the presence of an alkaline solution. Notable among the numerous publications and patents relating to silica production is U.S. Pat. No. 4,336,235 to Deabriges, which teaches a method for the production of sodium silicate involving the calcination of sand with sodium carbonate at 1,500° C., followed by the dissolution of the solid mass in an autoclave, to obtain a sodium silicate solution. By treating this solution with hydrochloric acid, an amorphous silica product with a high surface area (200 m$^2$/g) is obtained. The product is suitable as a filler for rubber and plastics. In another silica production process, fluosilicic acid (or a salt thereof) is hydrolyzed with alkali, whereby amorphous silica precipitates from fluoride solution. In the above-described processes, the amorphous silica product is contaminated by impurities present in the mother liquor.

U.S. Pat. No. 6,312,656 to Blackwell et al., describes other patents concerning the production of silica, and particularly pure amorphous silica, from siloxanes. It is emphasized by Blackwell et al., that some processes are costly, because of the use of siloxanes as raw material, but yield products that are suitable for the production of high quality glass, especially optical glasses. The raw material in this process is purified polyalkyloxane, from which the silica is obtained by thermal decomposition. Another process in which silicon tetrachloride by hydrolysis is used, produces very pure silica, but this process is also very costly: For the production of one ton of silica, approximately three tons of expensive silicon tetrachloride are needed.

U.S. Pat. No. 5,853,685 to Erickson discloses a process for producing high purity silica from waste by-product silica and hydrogen fluoride. The high purity silica is obtained by the reaction of impure by-product waste silica with hydrogen fluoride, preferably in the presence of water or sulfuric acid, producing silicon tetrafluoride gas and a mother liquor. The silicon tetrafluoride is separated from the mother liquor, which retains the impurities originally contained within the impure silica. The silicon tetrafluoride gas is contacted with high-purity water, in a clean environment, to form a slurry of high purity silica and high-purity hydrofluosilicic acid. A portion of the silica is filtered from the slurry and washed, producing a high purity silica product. The rest of the silica-hydrofluosilicic acid slurry is preferably reacted with ammonia to form a slurry of ammonium fluoride and silica. The silica is separated from the ammonium fluoride and preferably washed and calcined to remove any remaining ammonium fluoride, leaving additional high purity silica product. The separated ammonium fluoride may be reacted with lime to produce additional products for recycling back into the process.

There are several deficiencies with the art taught by U.S. Pat. No. 5,853,685. The reaction with ammonia, separation of ammonium fluoride, and ammonia recovery stages are capital-intensive and energy-intensive, and introduce various safety concerns into the industrial process.

Moreover, as taught, the process requires the costly addition of both hydrogen fluoride and lime, as well as an ammonia make-up stream. The generally infeasible process economics are acknowledged by U.S. Pat. No. 5,853,685 to Erickson:

Under current economic conditions, the price of hydrogen fluoride, at approximately $550.00 per ton, may make it economically impractical to purify silica in the above-described manner in most situations. The cost for the raw materials alone would be approximately $1.10 per pound. However, where low cost hydrogen fluoride is available and fluosilicic acid can be reused, the process of the present invention is economically feasible, as the cost of the pure silica is approximately $0.11/lb.

There is therefore a recognized need for, and it would be highly advantageous to have, a process for producing high-purity silica that that is more simple and economical than the processes known in the art, and overcomes the manifest deficiencies thereof. It would be of further advantage to have a process that can utilize various low-grade sources of silica to produce the high-purity silica.

SUMMARY OF THE INVENTION

It is, therefore, an object of the present invention to provide a simple, efficient, and cost effective process for the production of high-purity silica.

According to the teachings of the present invention there is provided a production process for producing high-purity silica from a crude silica source by means of fluosilicic acid, including the steps of: (a) subjecting the crude silica source and the fluosilicic acid to a reaction in a reaction stage of the production process, so as to produce silicon tetrafluoride and water; (b) selectively evaporating the silicon tetrafluoride with respect to at least a portion of at least one impurity derived from the crude silica source, and (c) reacting the silicon tetrafluoride with water to produce the high-purity silica and regenerated fluosilicic acid, wherein the reaction stage (a) is performed at a temperature above 75° C.

According to further features in the described preferred embodiments, the reaction stage (a) is performed at a temperature above 85° C., more preferably, above 90° C., and up to a boiling point temperature of the aqueous medium in the reaction stage.

According to still further features in the described preferred embodiments, the evaporate produced in step (b) contains water vapor and silicon tetrafluoride, and the weight ratio of the water vapor to the silicon tetrafluoride is greater than 1.0 to 1.

According to still further features in the described preferred embodiments, the weight ratio of the water vapor to the silicon tetrafluoride is greater than 2.0 to 1.

According to still further features in the described preferred embodiments, the process further includes the step of: (d) recycling the regenerated fluosilicic acid within the production process.

According to still further features in the described preferred embodiments, the regenerated fluosilicic acid is substantially completely recycled within the production process.

According to still further features in the described preferred embodiments, the process further includes the step of: (d) recycling the regenerated fluosilicic acid to step (a).

According to still further features in the described preferred embodiments, the reacting stage (c) includes cooling to a temperature below 75° C.

According to still further features in the described preferred embodiments, the reacting stage includes cooling to a temperature between 150 and 75° C.

According to still further features in the described preferred embodiments, the reacting stage includes cooling to a temperature between 55° and 75° C.

According to still further features in the described preferred embodiments, a solid residue is produced in step (a), the process further including the step of: (d) separating the solid residue from a liquid phase from the reaction stage.

According to still further features in the described preferred embodiments, the process further includes a pre-treatment step of (d) pre-treating a raw silica source so as to achieve at least a partial dissolution of at least one impurity within the raw silica source, yielding thereby the crude silica source in an aqueous medium.

According to still further features in the described preferred embodiments, the partial dissolution is effected with an acid.

According to still further features in the described preferred embodiments, the pre-treatment step further includes effecting a solid/liquid separation after the dissolution, so as to obtain the crude silica source for introducing in the reaction stage.

According to still further features in the described preferred embodiments, the water in step (c) includes water evaporated along with the silicon tetrafluoride.

According to still further features in the described preferred embodiments, the water in step (c) consists solely of the water evaporated along with the silicon tetrafluoride.

According to still further features in the described preferred embodiments, the silicon tetrafluoride evaporated in step (b) is absorbed by the water in step (c).

According to still further features in the described preferred embodiments, the high-purity silica precipitated by absorption is hydrophilic, and has a surface area exceeding 80 $m^2/g$.

According to still further features in the described preferred embodiments, the silicon tetrafluoride evaporated in step (b) is indirectly condensed along with the water in step (c).

According to still further features in the described preferred embodiments, the high-purity, indirectly condensed silica is hydrophobic, and has a surface area below 20 $m^2/g$.

According to still further features in the described preferred embodiments, substantially all of the high-purity silica produced is derived from the crude silica source.

According to still further features in the described preferred embodiments, the process further includes the step of: (d) recycling the regenerated fluosilicic acid within the production process.

According to still further features in the described preferred embodiments, the high-purity silica obtained has a silica ($SiO_2$) content of at least 99.9%, after calcination.

According to still further features in the described preferred embodiments, the high-purity silica obtained has a silica content of at least 99.99%.

According to still further features in the described preferred embodiments, step (a) takes place in an aqueous medium containing the fluosilicic acid and at least a second mineral acid, and wherein the second acid has a concentration of less than 5% by weight.

According to still further features in the described preferred embodiments, the second acid has a concentration of less than 2% by weight.

According to still further features in the described preferred embodiments, the second acid is selected from the group consisting of sulfuric acid, hydrochloric acid and phosphoric acid, and mixtures therof.

According to still further features in the described preferred embodiments, an excess of the fluosilicic acid is added to the production process, such that at least a portion of the higher-purity, regenerated fluosilicic acid is removed as a co-product.

According to still further features in the described preferred embodiments, the co-product is technical-grade or food-grade fluosilicic acid.

BRIEF DESCRIPTION OF THE FIGURE

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawing.

DETAILED DESCRIPTION OF THE INVENTION

Figure 1:
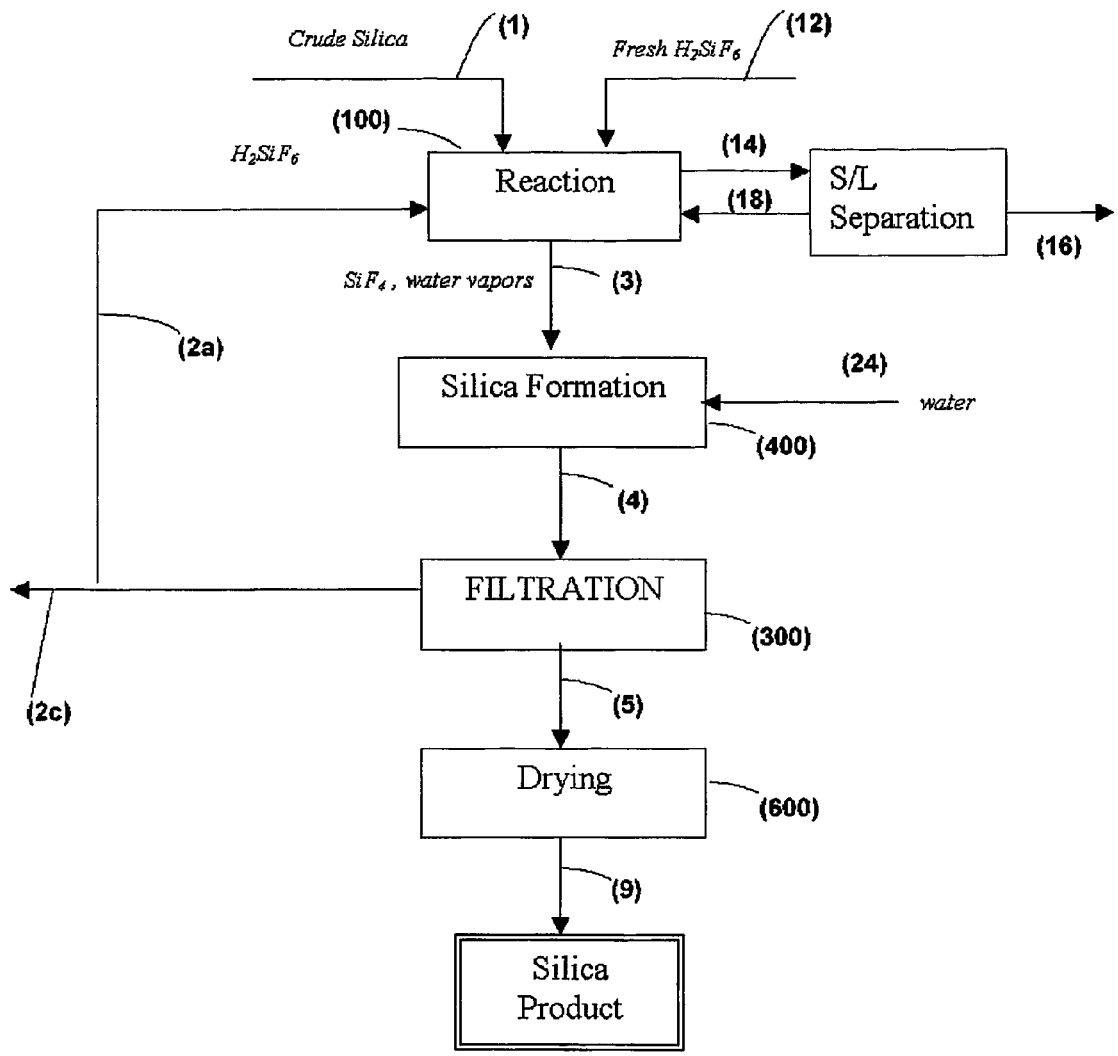
FIG. 1 is a block diagram of the inventive method for processing a silica feed source with recirculated fluosilicic acid.

The present invention is a method of producing pure silica by reacting a crude silica feed source with with fluosilicic acid so as to produce an ultra-pure silicon tetra-fluoride intermediate.

The principles and operation of the method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

As described briefly hereinabove, U.S. Pat. No. 5,853,685 to Erickson teaches a process for producing high purity silica from waste by-product silica and hydrogen fluoride. The high purity silica is obtained by the reaction of impure by-product waste silica with hydrogen fluoride, preferably in the presence of water or sulfuric acid, producing silicon tetrafluoride gas and a mother liquor. The silicon tetrafluoride is separated from the mother liquor, which retains the impurities originally contained within the impure silica. The silicon tetrafluoride gas is contacted with high-purity water, in a clean environment, to form a slurry of high purity silica and high-purity hydrofluosilicic acid. A portion of the silica is filtered from the slurry and washed. The rest of the silica-hydrofluosilicic acid slurry is reacted with ammonia to form a slurry of ammonium fluoride and silica. The silica is separated from the ammonium fluoride and preferably washed and calcined to remove any remaining ammonium fluoride, leaving additional high purity silica product.

The process disclosed by U.S. Pat. No. 5,853,685 requires the costly addition of hydrogen fluoride, which is lost in the bleed stream from the reactor, as well as in the calcination stage. The fluoride in the hydrogen fluoride feed may also be removed from the process as ammonium fluoride by-product, which generally involves a significant loss on the fluoride value introduced as raw material.

The process according to the present invention obviates the need for ammonia-related stages, including the ammonia reaction, ammonium fluoride separation, and ammonia recovery stages.

More importantly, and by sharp contrast to the known art, the inventive process produces high-purity silica from a crude silica source using fluosilicic acid, an available and inexpensive material with respect to hydrogen fluoride. Initially, the fluosilicic acid and the crude silica source are reacted to produce silicon tetrafluoride and water in an aqueous medium. The silicon tetrafluoride is selectively evaporated with respect to the impurities (which are derived from the crude silica source and from the fluosilicic acid) in the reaction mixture. Subsequently, the silicon tetrafluoride is reacted with water at a temperature below 75° C. to produce the high-purity silica, along with fluosilicic acid.

Reference is now made to FIG. 1, in which a method for the production of pure silica from a crude silica feed source is schematically presented. The crude silica feed 1 is admixed with fluosilicic acid 2a in reaction step 100. The silica in crude silica feed 1 largely dissolves, producing silicon tetrafluoride and water according to the stoichiometry of the following equation:

$$2H_2SiF_6 + SiO_2 = 3SiF_4 + 2H_2O \quad (1)$$

The reaction temperature is controlled such that the silicon tetrafluoride is evaporated from the reaction mixture. The various impurities in the reaction mixture remain in the solid or liquid phase, such that the evaporation allows for selective removal of the silicon, as silicon tetrafluoride, from the reaction mixture in reaction step 100. The reaction conditions are further controlled such that water, which is stoichiometrically produced according to equation (1), is evaporated along with the silicon tetrafluoride.

Hence, the evaporate 3, containing exclusively, or substantially exclusively, silicon tetrafluoride and water, is introduced to a silica formation stage 400. Preferably, evaporate 3 is cooled in silica formation stage 400 to produce refined silica and food-grade fluosilicic acid according to the stoichiometry of the following equation:

$$3SiF_4 + 2H_2O = 2H_2SiF_6 + SiO_2 \quad (2)$$

The suspension containing refined silica 4 is filtered in a filtration stage 300. The fluosilicic acid is recycled in stream 2a to reaction stage 100. The filtered silica solids 5 are then processed in a drying stage 600, whereby high-purity silica 9 is obtained. Drying stage 600 may include drying, or calcination, or drying followed by calcination, according to various techno-economic considerations.

It follows from the combination of equations (1) and (2) that theoretically, the fluosilicic acid is neither produced nor consumed. It is also clear that the amorphous silica is not derived from the fluosilicic acid, but from the dissolved silica. On the practical, operational level, the fluosilicic acid is recovered almost totally and thus provides for a inexpensive process with respect to known processes. A fluosilicic acid make-up stream 12 provides fluosilicic acid at a rate substantially equal to the fluosilicic acid losses of the process.

The process of the present invention is appropriate for both batch and continuous production of high-purity silica. As used herein in the specification and in the claims section that follows, the term "recycled" and the like, used in conjunction with fluosilicic acid, refer to reuse within the process, most typically in reaction stage 100. It will be appreciated by one skilled in the art that in batch processes, the fluosilicic acid is recycled to the reaction stage of an additional or subsequent batch.

As used herein in the specification and in the claims section that follows, the term "substantially completely recycled" and the like, used in conjunction with fluosilicic acid, refer to complete recycle of the fluosilicic acid, with the exception of process losses in bleed streams, calination, and the like.

As used herein in the specification and in the claims section that follows, the term "crude silica source" refers to a raw material or combination of raw materials, separately or together containing silicon and oxygen, such as impure silica and silicates from natural and artificial sources. Specifically included are clays, coal ash, porcellanite, and fluosilicic acid (along with water or another source of oxygen).

It must be emphasized that in the art taught by U.S. Pat. No. 5,853,685 to Erickson, sulfuric acid is preferably added to the first reactor to maintain a concentration of 65 to 75% free sulfuric acid. At this concentration, the solubility of the hydrogen fluoride is at a minimum, and the reaction of the silicon tetrafluoride with free water to form fluosilicic acid in the first reactor is kept to a minimum. A relatively dry gas is produced, preventing the precipitation of silica prior to its reaching the precipitator.

By sharp contrast, no sulfuric acid is requisite in the process of the present invention. The sulfuric acid added to the reaction stage in U.S. Pat. No. 5,853,685 leaves the process in a waste stream, with clear economic and ecological ramifications. Moreover, in the prior-art process, there is an acute economic danger of fluosilicic acid production in the reaction stage, being that extremely costly fluoride will be lost along with the waste stream from the reaction stage. In the inventive process, the predominant component of the liquid phase is fluosilicic acid, which is ultimately recycled back to the reaction stage, such that there is no problem with any fluosilicic acid production in the reaction stage.

Moreover, whereas the prior art teaches that the production of a relatively dry silicon tetrafluoride gas is highly advantageous in preventing the precipitation of silica prior to the silica formation stage, the inventors of the present invention have discovered that by operating the reaction mixture with a high concentration of fluosilicic acid (preferably, at least 20% by weight, and more preferably, at least 25%) and with a low concentration (0-5%) of other mineral acids such as sulfuric acid, a wet silicon tetrafluoride gas is advantageously produced. Precipitation of silica in the vapor path leading to silica formation stage 400 is prevented by means of insulated and/or heated piping, according to standard technologies. The production of wet silicon tetrafluoride gas also obviates (or greatly reduces) the need for external feedwater in the silica formation stage 400. Most of this water is ultimately returned to the reaction stage of the prior art process, diluting the reaction stage and requiring more concentrated acid feeds.

Preferably, the weight ratio of water to silicon tetrafluoride in evaporate 3 is greater than 1:1, more preferably, above 2:1, and most preferably, above 2.7:1.

The preferred temperature for reaction stage 100 of the present invention is above 75° C., more preferably above 85° C., and most preferably between 90° C. and the boiling point. It will be appreciated by one skilled in the art that elevated boiling temperatures are possible, depending on the composition of the aqueous solution (e.g., if additional mineral acids are present). Also, higher operating temperatures can be obtained by operating reaction stage 100 above atmospheric pressure.

A bleed stream is preferably drawn from reaction stage 100. Mother liquor or mother liquor with solids can be withdrawn as a bleed stream from reaction stage 100 (e.g., via stream 14) without a solid/liquid separation step. However, as shown in FIG. 1, a solid/liquid separation step is typically used to remove unreacted and/or impurity-rich solids (as well as a small portion of the mother liquor as a bleed of the aqueous phase) from the process via stream 16, while returning the bulk of the liquid phase to the process via stream 18.

According to another preferred embodiment of the present invention, silica formation stage 400 is preferably carried out below 75° C., more preferably between 55° C.-75° C., and most preferably at about 60° C. As described hereinabove with respect to reaction stage 100, it will be appreciated by one skilled in the art that other preferred operating temperatures are possible, depending on the concentration of the fluosilicic acid solution, and on the operating pressure of silica formation stage 400.

According to another preferred embodiment of the present invention, silica formation stage 400 is operated as an indirect condenser (i.e., indirect cooling), such that the reaction takes place with the water in evaporate 3. It has been found that the high-purity silica produced from such a unit operation is hydrophobic, having a correspondingly low surface area of less than 20 m$^2$ per gram, and more typically, less than 8-10 m$^2$ per gram.

According to another preferred embodiment of the present invention, evaporate 3 containing the silicon tetrafluoride vapor is absorbed with additional, pure external feedwater (from stream 24) in silica formation stage 400. It has been discovered that the high-purity silica produced from silica formation by absorption is hydrophilic, having a correspondingly high surface area of over 80 m$^2$ per gram, and more typically, over 100 m$^2$ per gram.

It has been observed that the silica obtained from the absorption process characteristically contains small, round particles. The silica obtained from condensation characteristically contains particles that look like broken egg-shells, particles that are considerably larger than the silica made by condensation.

The silica obtained by absorption dissolves more readily in alkali solution to produce pure alkali-silicate solution, than the silica produced by condensation. It is also difficult to make a homogeneous slurry of the latter in water, without the addition of surface-active agents. The silica produced by condensation is, however, more suitable for the production of vitreous silica articles, optical glasses, etc.

A wide variety of silica-containing materials are suitable as raw materials for the inventive process. For example, residues from the production of aluminum compounds, obtained from the leaching of aluminum containing ores by mineral acids, is a very cheap source of suitable raw material. Silica is present in various clays, coal ash, and in several other raw materials at an amount of up to about 50% (by weight). The price of these raw materials is quite low, and usually is in the range of $10 to $30 per ton. Thus, the cost of the silica raw material is negligible.

It is acknowledged, however, that not every type of silica feed material is appropriate for the process of the present invention. Sand, for example, which is obtained in nature by a process of relatively high temperatures and thus has the constitution of quartz, is not a practical raw material.

According to another preferred embodiment of the present invention, fluosilicic acid make-up stream 12 includes low-quality fluosilicic acid.

According to another preferred embodiment of the present invention, excess fluosilicic acid make-up stream 12 contains an excess of fluosilicic acid, with respect to process losses, with the balance of fluosilicic acid being removed via stream 2c as technical-grade or food-grade product.

EXAMPLES

Example 1

The raw material for the experiment was a clay residue (from a clay initially containing 35.5%, $Al_2O_3$, 9.6% $Fe_2O_3$, 54.0% $SiO_2$) from which the aluminum oxide was leached by mineral acids at a previous stage at 70° C., whereby 83% of the aluminum oxide was dissolved.

To 30.0 g of the leached residue were added 50 ml water, and the suspension was treated by adding 66 g of concentrated sulfuric acid by heating for about one hour at 100° C.-110° C. to dissolve the iron and aluminum oxide residues. 150 ml of water were then added, and the suspension was filtered.

The new residue was washed and dried. To the dry residue, weighing 22.7 g, 445.0 g of fluosilicic acid (24%) were added, and the suspension was evaporated to dryness. After cooling the evaporate, the mixture contained 414 g fluosilicic acid, (23.6% $H_2SiF_6$) and precipitated silica. The silica was filtered off, washed and dried. The pure, dry silica obtained weighed 20.6 g, corresponding to approximately 90.7% of the residue obtained after the dissolution of the aluminum and ferric oxide. About 2.5% of the silica was not dissolved by the fluosilicic acid.

After calcining, the product contained more than 99.99% $SiO_2$, on a dry basis. The impurity levels in the product are provided in Table 1.

It must be emphasized that the pre-leaching stage is optional, and that generally, the process can be performed without a pre-leaching stage.

Example 2

The experiment was carried out according to Example 1. First, iron and aluminum oxide were removed by the addition of 80 g sulfuric acid. For the reaction with fluosilicic acid, 10% more of the acid was introduced. The slurry was heated for one hour, but was not evaporated to dryness. The yield of silica from the condensate was only 65%, significantly less than in Example 1, due to the reduced heating. The silica obtained was hydrophobic.

After washing, filtering, drying, and calcining, the product contained better than 99.99% $SiO_2$, on a dry basis. The impurity levels in the product are provided in Table 1.

It should be emphasized that the bulk of the impurities present in the final product are entrained with the vapors from reaction stage 100, and that a more robust design and control of the system can yield silica of even higher purity.

Example 3

The experiment was carried out with a sample of porcellanite, a silica-containing mineral that is known to accompany phosphate ore fields. The porcellanite used in the experiment contained 56.3.% silica, of which 38% was defined as soluble in caustic soda. The other components of the porcellanite sample include calcium carbonate, calcium phosphate and calcium sulfate, with low concentrations of ferric oxide and aluminum oxide.

To 25.0 g of the sample were added 50 g of water and 100 g of concentrated hydrochloric acid. The slurry was heated for about one hour to dissolve the carbonate and other soluble residues. The insoluble fraction was filtered off and washed. The weight of the residue, after drying, was 16.1 g, i.e., about 36.6% of the sample dissolved. The silica remained in the insoluble matter.

To this residue, 378 g of fluosilicic acid (24%) were added. The slurry was heated and evaporated to dryness. The residue left was filtered off and washed. The weight of the residue was 5.5 g before drying, and 2.58 g after drying. 13.52 g of the original residue were evaporated. Accordingly, 52.8% of the silica of the porcellanite was obtained in the process.

The vapors were condensed, whereby 352 g of fluosilicic acid (23.5)% were obtained.

The calcined product contained better than 99.99% $SiO_2$, on a dry basis. The impurity levels in the product are provided in Table 1.

TABLE 1

The concentration of impurities in the silica product (ppm)

| Element | Exp. 1 | Exp. 2 | Exp. 3 |
|---|---|---|---|
| Al | 0.80 | 0.80 | 1.50 |
| V | 0.40 | 0.22 | 0.32 |
| Fe | 0.40 | 0.22 | 0.32 |
| Na | 7 | 1.5 | 1.7 |
| K | 0.20 | 0.30 | <0.20 |
| Li | 0.002 | 0.0015 | 0.0015 |
| Co | <2 | <2 | <2 |
| Ca | 5 | 3 | 2.5 |
| Cr | 0.012 | 0.007 | 0.012 |
| Cu | 0.35 | 0.35 | 0.15 |
| Ge | 0.0027 | 0.0022 | 0.001 |
| Mg | 0.30 | 0.25 | 0.15 |
| Ni | 0.0015 | 0.010 | 0.008 |
| P | 0.010 | 0.008 | 0.009 |
| Ti | 1.80 | 0.045 | 0.038 |
| Zn | 2.00 | 1.90 | 0.07 |
| Zr | <0.05 | <0.05 | <0.05 |

The amorphous silica produced contained better than 99.99% $SiO_2$ (dry basis)

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A production process for producing a solid silica product from a crude, impure silica source by means of fluosilicic acid, the process comprising the steps of:
    (a) subjecting the crude silica source and the fluosilicic acid to a reaction in a first stage of the production process, to produce silicon tetrafluoride and water in a liquid phase, said reaction performed at a temperature above 75° C.;
    (b) selectively evaporating said silicon tetrafluoride and water with respect to at least a portion of at least one impurity derived from the crude silica source, to produce silicon tetrafluoride vapor and water vapor;
    (c) reacting said silicon tetrafluoride vapor with a water source in a second stage to produce the silica product and a regenerated fluosilicic acid, and
    (d) recycling said regenerated fluosilicic acid within the production process, wherein said water vapor is said water source, and wherein said silicon tetrafluoride vapor is indirectly condensed along with said water vapor, to produce the solid silica product and said fluosilicic acid,
wherein the solid silica product has a silica ($SiO_2$) content of at least 99.9%, and wherein said liquid phase from said first stage is restricted from entering said second stage.

2. The process of claim 1, wherein the pure silica obtained has a silica ($SiO_2$) content of at least 99.99%.

3. The process of claim 1, wherein the high-purity silica has a surface area below 20 $m^2/g$.

4. The process of claim 1, wherein the high-purity silica has a surface area below 8-10 $m^2/g$.

5. The process of claim 1, wherein a solid residue is produced in step (a), the process further comprising the step of:
    (e) separating said solid residue from said liquid phase.

6. The process of claim 5, wherein after said separating, said liquid phase is directly returned to said first stage.

7. The process of claim 1, wherein a weight ratio of said water vapor to said silicon tetrafluoride vapor is greater than 1.0 to 1.

8. The process of claim 1, wherein a weight ratio of said water vapor to said silicon tetrafluoride vapor is greater than 2.0 to 1.

9. The process of claim 1, wherein a weight ratio of said water vapor to said silicon tetrafluoride vapor is greater than 2.7 to 1.

10. The process of claim 1, further comprising a pre-treatment step of: (e) pre-treating a raw silica source so as to achieve at least a partial dissolution of at least one impurity within said raw silica source, yielding thereby said crude silica source in an aqueous medium.

11. The process of claim 10, wherein said partial dissolution is effected with an acid.

12. The process of claim 10, wherein said pre-treatment step further includes effecting a solid/liquid separation after said dissolution, so as to obtain said crude silica source for introducing in said first stage.

13. The process of claim 1, wherein step (a) takes place in an aqueous medium, said aqueous medium containing the fluosilicic acid and at least a second acid, and wherein said second acid has a concentration of less than 5% by weight.

14. The process of claim 13, wherein said second acid has a concentration of less than 2% by weight.

15. The process of claim 13, wherein said second acid is selected from the group consisting of hydrochloric acid and phosphoric acid.

16. The process of claim 14, wherein said second acid is selected from the group consisting of sulfuric acid, hydrochloric acid, and phosphoric acid.

17. The process of claim 13, wherein said second acid is sulfuric acid.

18. The process of claim 1, wherein an excess of the fluosilicic acid is added to the production process, such that at least a portion of said regenerated fluosilicic acid is removed as a co-product.

19. The process of claim 18, wherein said regenerated fluosilicic acid is of a higher purity with respect to the fluosilicic acid of step (a).

20. A production process for producing a solid silica product from a crude, impure silica source by means of fluosilicic acid, the process comprising the steps of:
  (a) subjecting the crude silica source and the fluosilicic acid to a reaction in a first stage of the production process, to produce silicon tetrafluoride and water in a liquid phase, said reaction performed at a temperature above 75° C.;
  (b) selectively evaporating said silicon tetrafluoride and water with respect to at least a portion of at least one impurity derived from the crude silica source, to produce silicon tetrafluoride vapor and water vapor, and
  (c) reacting said silicon tetrafluoride vapor with a water source in a second stage to produce the silica product and a regenerated fluosilicic acid, wherein said water vapor is said water source, and wherein said silicon tetrafluoride vapor is indirectly condensed along with said water vapor, to produce the solid silica product and said fluosilicic acid, wherein the solid silica product has a silica ($SiO_2$) content of at least 99.9%, and wherein said liquid phase from said first stage is restricted from entering said second stage, and wherein the high-purity silica has a surface area below 20 m2/g.

21. The process of claim 20, wherein the high-purity silica has a surface area below 8-10 $m^2$/g.

22. The process of claim 20, wherein a weight ratio of said water vapor to said silicon tetrafluoride vapor is greater than 2.7 to 1.

* * * * *